(12) United States Patent
Tsai

(10) Patent No.: US 9,762,649 B2
(45) Date of Patent: Sep. 12, 2017

(54) EUI BASED REMOTE DATABASE FOR DYNAMIC DEVICE CONTROL

(71) Applicant: HEWLETT-PACKARD DEVELOPMENT COMPANY, L.P., Houston, TX (US)

(72) Inventor: Leonard Tsai, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 203 days.

(21) Appl. No.: 14/051,570

(22) Filed: Oct. 11, 2013

(65) Prior Publication Data

US 2014/0047076 A1 Feb. 13, 2014

Related U.S. Application Data

(62) Division of application No. 13/122,407, filed as application No. PCT/US2008/078668 on Oct. 3, 2008, now abandoned.

(51) Int. Cl.
*H04L 29/08* (2006.01)
*G08C 19/28* (2006.01)

(52) U.S. Cl.
CPC .............. *H04L 67/06* (2013.01); *G08C 19/28* (2013.01); *G08C 2201/21* (2013.01); *G08C 2201/92* (2013.01)

(58) Field of Classification Search
CPC ....................................................... H04L 29/08
See application file for complete search history.

(56) References Cited

U.S. PATENT DOCUMENTS

| 6,133,847 A * | 10/2000 | Yang ............... 340/12.25 |
| 6,240,451 B1 | 5/2001 | Campbell et al. |
| 6,389,461 B1 | 5/2002 | Shah |
| 6,665,020 B1 | 12/2003 | Stahl et al. |

(Continued)

FOREIGN PATENT DOCUMENTS

| DE | 10310746 A1 | 12/2004 |
| EP | 1605717 | 12/2005 |

(Continued)

OTHER PUBLICATIONS

Examination Report Under Section 18(3) received in GB Application No. 1104968.1, mailed Dec. 6, 2013, 3 pgs.

(Continued)

*Primary Examiner* — Rasheed Gidado
(74) *Attorney, Agent, or Firm* — HP Inc. Patent Department

(57) ABSTRACT

Systems and methods for controlling one or more appliances are provided. One or more appliances (150), each having one or more unique identifiers and one or more first network adapters can be in communication with one or more first networks (140). One or more network adapter devices (120) capable of bi-directional communication on the first network (140) and on one or more second networks (160) can be disposed on the first network (140). One or more appliance databases can be disposed in, on, or about the one or more second networks (160). One or more handheld controllers (110) can be in communication with the one or more network adapter devices (120) and the one or more appliances (150).

18 Claims, 7 Drawing Sheets

(56) References Cited

U.S. PATENT DOCUMENTS

| | | | |
|---|---|---|---|
| 6,735,619 B1 | 5/2004 | Tawada | |
| 6,956,461 B2* | 10/2005 | Yoon | G05B 19/0421 340/12.52 |
| 7,072,945 B1* | 7/2006 | Nieminen et al. | 709/217 |
| 7,081,830 B2* | 7/2006 | Shimba et al. | 340/12.31 |
| 7,093,003 B2* | 8/2006 | Yuh et al. | 709/219 |
| 7,447,788 B2* | 11/2008 | Ahmed et al. | 709/230 |
| 7,633,959 B2* | 12/2009 | Ajitomi et al. | 370/402 |
| 7,957,697 B2* | 6/2011 | Park et al. | 455/41.2 |
| 7,961,661 B2* | 6/2011 | Hargrave et al. | 370/311 |
| 8,335,223 B2* | 12/2012 | Zhou | H04L 12/2834 370/421 |
| 9,088,663 B2* | 7/2015 | Arling | G06F 3/0486 |
| 2003/0048757 A1 | 3/2003 | Accarie et al. | |
| 2004/0148632 A1 | 7/2004 | Park | |
| 2004/0205246 A1 | 10/2004 | Park | |
| 2005/0080879 A1 | 4/2005 | Kim | |
| 2005/0159823 A1* | 7/2005 | Hayes | G05B 15/02 700/19 |
| 2006/0168618 A1* | 7/2006 | Choi | G08C 17/02 725/37 |
| 2006/0178777 A1* | 8/2006 | Park | B25J 9/0003 700/245 |
| 2007/0067725 A1 | 3/2007 | Cahill et al. | |
| 2007/0123194 A1 | 5/2007 | Karaoguz et al. | |
| 2008/0137572 A1 | 6/2008 | Park | |
| 2009/0010233 A1 | 1/2009 | Pratt, Jr. | |
| 2009/0135736 A1* | 5/2009 | Lin | H04L 12/4633 370/254 |
| 2009/0217335 A1* | 8/2009 | Wong | H04N 21/4126 725/114 |

FOREIGN PATENT DOCUMENTS

| | | |
|---|---|---|
| KR | 102004009319 | 11/2004 |
| WO | WO-2004/089035 | 10/2004 |
| WO | WO-2008/112248 A1 | 9/2008 |
| WO | WO-2008112248 A1 | 9/2008 |
| WO | WO-2009/077878 | 6/2009 |

OTHER PUBLICATIONS

IEEE, Guidelines for use of a 64-bit Extended Unique Identifier (EUI-64) available at http://standards.ieee.org/develop/regauth/tut/eui60.pdf, downloaded Mar. 22, 2011 (2 pages).

Korean Intellectual Property Office, International Search Report, mailed Jun. 19, 2009, PCT/US2008/078668, filed Oct. 3, 2008 (12 pages).

The International Bureau of WIPO, International Preliminary Report on Patentability for PCT/US2008/078668 dated Apr. 14, 2011 (7 pages).

UK Intellectual Property Office, Examination Report for GB1104968.1 under Section 18(3) dated May 13, 2014 (3 pages).

UK Intellectual Property Office, Examination Report for GB1104968.1 under Section 18(3) dated Dec. 6, 2013 (3 pages).

* cited by examiner

| OUI | | | EXTENSION ID | | |
|---|---|---|---|---|---|
| EUI(0) | EUI(1) | EUI(2) | EUI(3) | EUI(4) | EUI(5) |
| 1st Byte | 2nd Byte | 3rd Byte | 4th Byte | 5th Byte | 6th Byte |
| 8 bits | 8 bits | 8 bits | 8 bits | 8 bits | 8 bits |

FIG. 2

| OUI | | | | | | EXTENSION ID | | | | | | | | |
|---|---|---|---|---|---|---|---|---|---|---|---|---|---|---|
| EUI(0) | EUI(1) | EUI(2) | EUI(3) | EUI(4) | EUI(5) | EUI(6) | EUI(7) | EUI(8) | EUI(9) | EUI(10) | EUI(11) | EUI(12) | EUI(13) | EUI(14) |
| 4 bits | 4 bits | 4 bits | 4 bits | 4 bits | 4 bits | 4 bits | 4 bits | 4 bits | 4 bits | 4 bits | 4 bits | 4 bits | 4 bits | 4 bits |

FIG. 3

| OUI | | | EXTENSION ID | | | | |
|---|---|---|---|---|---|---|---|
| EUI(0) | EUI(1) | EUI(2) | EUI(3) | EUI(4) | EUI(5) | EUI(6) | EUI(7) |
| 1st Byte | 2nd Byte | 3rd Byte | 4th Byte | 5th Byte | 6th Byte | 7th Byte | 8th Byte |
| 8 bits | 8 bits | 8 bits | 8 bits | 8 bits | 8 bits | 8 bits | 8 bits |

FIG. 4

EUI BASED REMOTE DATABASE FOR DYNAMIC DEVICE CONTROL

CROSS-REFERENCE TO RELATED APPLICATION

This application is a divisional of U.S. application Ser. No. 13/122,407 filed Apr. 2, 2011, U.S. Publication No. 2011/0182278, which is a national stage application under 35 U.S.C. §371 of PCT/US2008/078668, filed Oct. 3, 2008, the disclosures of which are hereby incorporated by reference.

BACKGROUND OF THE INVENTION

Most electronic devices in the modern day home are equipped with some form of wireless remote control device. Present day wireless devices include televisions, stereo equipment, video equipment such as DVD players, Digital Video Recorders (DVRs), and Video Cassette Recorders (VCRs), cable television adapters, satellite television adapters, and the like. Given the prevalence of relatively inexpensive network interfaces, the number of devices equipped with wireless controls will only increase into the future. The future may hold wireless controlled household furnishings and appliances such as lamps, washers, dryers, dishwashers, ventilation fans, and the like.

Since each remotely controlled appliance is usually supplied with one or more remote controllers, even a small household can accumulate a considerable number of remote controllers. The remote controllers are often great in number and similar in appearance. Frequently, the remote controllers are scattered about, hidden between sofa cushions, buried in the pet's bed, or lodged in an inaccessible location which is usually replete with a substantial accumulation of lint. While multifunction remote controllers may reduce the sheer number of controllers, most so called "universal" wireless remote controllers can handle only a limited number of devices, usually between 3 and 10. Given the potential growth in remote controlled appliances, it seems only a matter of time until a household will have a plethora of 10-in-1 controllers scattered where individual TV, DVD, and cable box remote controllers once roamed.

Universal remote control devices also have the drawback of requiring the user to "program" the controller. Generally, this "programming" occurs in one of two ways. The first way is to simply take the universal remote, place it in "learn" mode and shoot the dedicated remote controller at the universal remote while it is in "learn" mode. Such programming is tedious, time-consuming, and requires considerable interaction between the user, the universal remote, and the dedicated remote controller. The second way is for the user to enter a manufacturer's "code" into the universal remote controller. Unfortunately, many off-brand appliances may not have codes, some newly arrived appliance brands may not have had codes at the time the universal remote database was flashed by the manufacturer, or "manufacturer A" on the faceplate of the wireless appliance actually tolled the production of the appliance through "manufacturer B." Other than frustration on the part of the consumer, the most frequently observed result in such instances is a television where the up volume, down channel, and channel buttons 3, 5, and 8 operate as intended, while every other button either does nothing or something totally unexpected.

There is a need, therefore, for a remote controller capable of accommodating a large number of wireless appliances, yet having a simple programming interface featuring an open architecture independent of one or more static databases of appliance control data flashed into the remote controller memory at the time of manufacture.

SUMMARY

A system for controlling one or more appliances is provided. One or more appliances, each having one or more unique identifiers and one or more first network adapters can be in communication with one or more first networks. One or more network adapter devices capable of bi-directional communication on the first network and on one or more second networks can be disposed on the first network. One or more appliance databases can be disposed or otherwise contained on the one or more second networks. One or more handheld controllers can be in communication with the one or more network adapter devices and the one or more appliances.

A method for controlling one or more appliances is also provided. One or more appliances having one or more unique identifiers and one or more first network adapters disposed therein can be communicatively coupled to a first network. One or more network access devices can also be communicatively coupled to the first network. The one or more network access devices can be communicatively coupled to a second network containing one or more appliance databases containing appliance control data. One or more handheld controllers having a memory disposed therein can also be communicatively coupled to the first network. The one or more unique identifiers can be transferred from the one or more appliances to the one or more network access device. The network access device can collect appliance control data from the second network and transfer the appliance control data to the handheld controller.

As used herein, the terms "appliance" and/or "appliances" can include, but are not limited to, any device, system or combination of systems and/or devices having one or more unique identifiers such as an IEEE Extended Unique Identifier ("EIU"). Such identifiers can uniquely identify a particular piece of equipment from a specific vendor, manufacturer, or other organization. Such remotely controlled appliances can include electrical devices, household appliances, computing devices, communication devices, and the like.

As used herein, the terms "Extended Unique Identifier" and/or "EUI" can include, but are not limited to, one or more 48-bit Extended Unique Identifiers ("EUI-48™"), one or more 60-bit Extended Unique Identifiers ("EUI-60™"), and/or one or more 64-bit Extended Unique Identifiers ("EUI-64™"). In one or more embodiments, the EUI can have an identification format in accordance with an Internet Protocol Version 6 ("IPv6") addressing system. In one or more specific embodiments, the EUI can be an EUI-64™ ID format in accordance with the IPv6 addressing system.

As used herein, "EUI-48™" refers to an identifier that is formed by concatenating the 24-bit Organizationally Unique Identifier ("OUI") with a 24-bit extension identifier that is assigned by the organization that purchased the OUI—the resulting identifier is generally represented as a set of octets separated by dashes (hexadecimal notation) or colons (bit-reversed notation) as in FF-FF-FF-FF-FF-FF or FF:FF:FF:FF:FF:FF, as a string of 6 bytes as in {FF,FF,FF,FF,FF,FF}, or as a base 16 number as in $\text{FFFFFFFFFFFF}_{16}$.

As used herein, "EUI-60™" refers to an identifier that is formed by concatenating the 24-bit OUI with a 36-bit extension identifier that is assigned by the organization that purchased the OUI. The resulting identifier is generally represented by a string of 15 nibbles, as a base 16 number as in FFFFFFFFFFFFFFF$_{16}$, or as FF-FF-FF:F.F.F.F.F.F.F.F as an EUI-64 value.

As used herein, "EUI-64™" refers to an identifier that is formed by concatenating the 24-bit OUI with a 40-bit extension identifier that is assigned by the organization that purchased the OUI—the resulting identifier is generally represented as a set of octets separated by dashes (hexadecimal notation) or colons (bit-reversed notation) as in FF-FF-FF-FF-FF-FF-FF-FF or FF:FF:FF:FF:FF:FF:FF:FF, as a string of 8 bytes as in {FF,FF,FF,FF,FF,FF,FF,FF}, or as a base 16 number as in FFFFFFFFFFFFFFFF$_{16}$. According to IEEE guidelines, the first four digits of the organizationally assigned identifier (i.e., the first four digits of the extension identifier) portion of an EUI-64™"shall not be FFFE$_{16}$ or FFFF$_{16}$" (i.e., EUI-64™ identifiers of the form ccccccFF-FEeeeeeeeee and ccccccFFFFeeeeeeeee are not allowed)—this is to support the encapsulation of MAC-48 and EUI-48™ values into EUI-64™ values.

DESCRIPTION OF THE DRAWINGS

Advantages of one or more disclosed embodiments may become apparent upon reading the following detailed description and upon reference to the drawings in which:

FIG. 2 depicts an exemplary appliance address using a 48-bit EUI according to one or more embodiments described;

FIG. 3 depicts an exemplary appliance address using a 60-bit EUI according to one or more embodiments described;

FIG. 4 depicts an exemplary appliance address using a 64-bit EUI according to one or more embodiments described;

DETAILED DESCRIPTION

Figure 1:
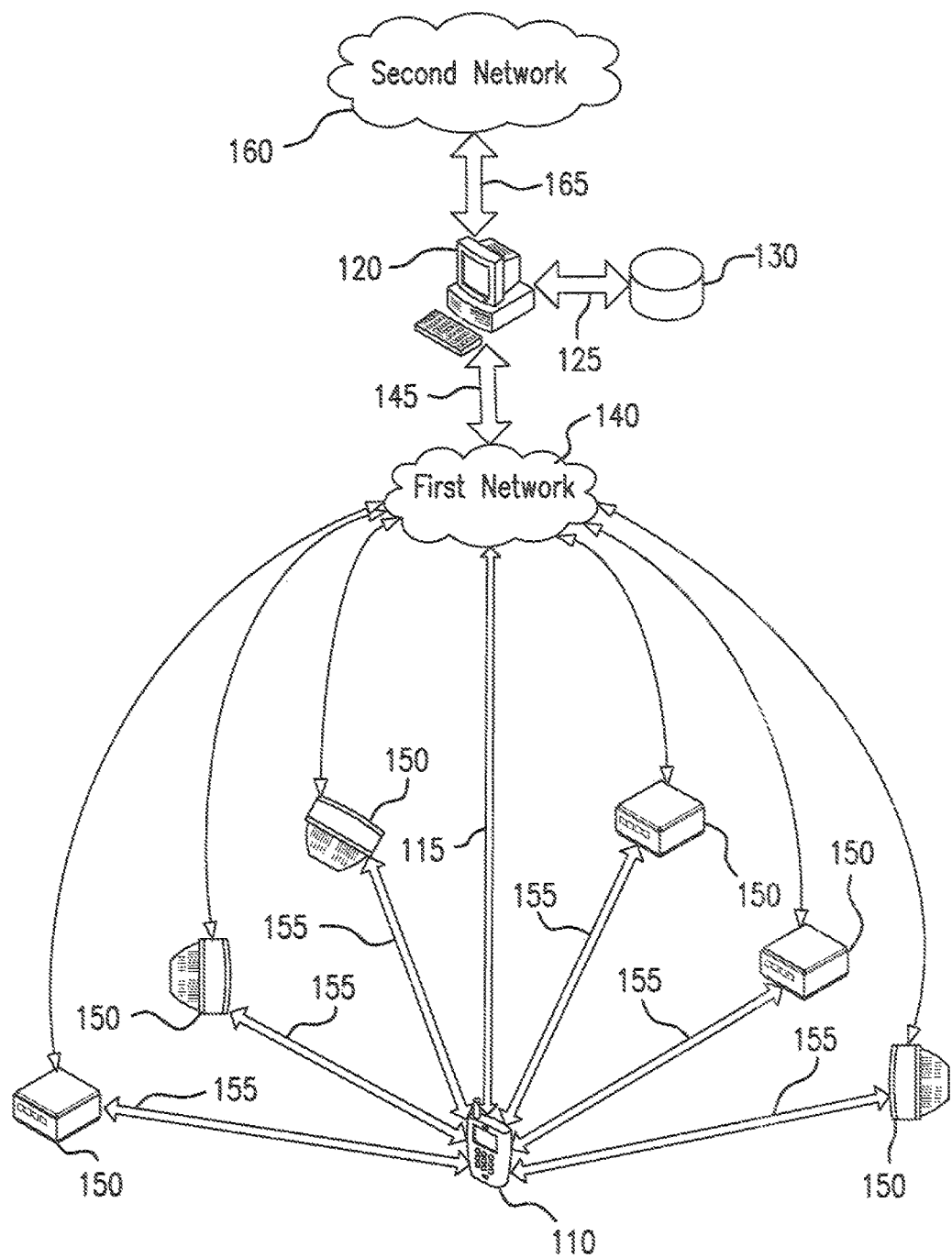
FIG. 1 depicts a schematic diagram of an illustrative system for programming a remote controller using one or more open databases, according to one or more embodiments described.

FIG. 1 depicts a schematic diagram of an illustrative system for programming a remote controller, according to one or more embodiments. In one or more embodiments, the illustrative system can include one or more controllers 110, one or more network access devices 120, one or more optional storage devices 130, one or more first networks 140, a plurality of remote controlled appliances 150, and one or more second networks 160. In one or more embodiments, the one or more remote controlled appliances 150 can include, but are not limited to, televisions, stereo equipment, video equipment, lamps, refrigerators, dish washers, washing machines, dryers, garage door openers, or any other electrical device found in the home, commerce or industry. In one or more embodiments, the number of remote controlled appliances 150 communicatively coupled to the one or more remote controllers 110 can range from a minimum of about 2; about 5; about 10; or about 20, to a maximum of about 10; about 30; about 50; about 100; about 200; or about 500.

In one or more embodiments, the system 100 can include two or more networks, two, 140 and 160, are depicted in FIG. 1. The one or more first networks 140 can include one or more local area networks, wide area networks, or any combination thereof to which one or more appliances 150 can be communicatively coupled. One or more network access devices 120 can be disposed on the first network 140 in such a manner that the one or more appliances 150 can communicate with the one or more network access devices 120. The one or more network access devices can be simultaneously or sequentially coupled to one or more second networks 160. The one or more second networks 160 can be a local area network, a wide area network, the internet, or any combination thereof. In one or more specific embodiments, the second network 160 can be the internet having one or more appliance databases containing appliance control data disposed thereupon.

It should be understood by one of ordinary skill in the art that a comprehensive list of remote controlled appliances would be virtually obsolete upon compilation due to the explosive growth within the field. Given this background, one of ordinary skill in the art would quickly realize the applicability of one or more embodiments of the present invention to any remote controlled appliance either presently in commerce or introduced to commerce at some point in the future. Such future remote controlled appliances, although not explicitly stated herein, are to be considered fully within the scope of one or more embodiments of the present invention.

The one or more controllers 110 can be used to control, adjust or otherwise affect the operation of the one or more remote controlled appliances 150 to which the controller is communicatively coupled. One or more control signals can be transmitted from the controller 110 to the one or more remote controlled appliances 150 via one or more communication links 155. The one or more communications links can be wired or wireless. In one or more embodiments, the one or more communications links 155 can be wireless, for example radio frequency (RF), infrared (IR), laser, or any combination thereof. The one or more controllers 110 can include, but are not limited to one or more handheld (i.e. mobile) devices, one or more stationary devices, or any combination thereof.

The one or more appliances 150 can include, but are not limited to, any number of remote controlled appliances, each having one or more unique identifiers. In one or more embodiments, the one or more unique identifiers can include, but are not limited to, one or more Extended Unique Identifiers (EUIs). The EUI can include one or more 48-bit IEEE EUIs (EUI-48™), one or more 60-bit IEEE EUIs (EUI-60™), one or more 64-bit IEEE EUIs (EUI-64™), or any combination thereof.

FIG. 2 depicts an exemplary appliance address using a 48-bit EUI according to one or more embodiments. A 48-bit EUI can include an initial 24-bit Organizationally Unique Identifier (OUI) followed by a 24-bit unique appliance identifier as issued by the registrant organization (OUI). A 48-bit EUI can permit the unique identification of approximately 16.8 million distinct appliances.

FIG. 3 depicts an exemplary appliance address using a 60-bit EUI according to one or more embodiments. A 60-bit EUI can include an initial 24-bit OUI followed by a 36-bit unique appliance identifier as issued by the registrant organization. A 60-bit EUI can permit the unique identification of approximately 68.7 billion distinct appliances.

FIG. 4 depicts an exemplary appliance address using a 64-bit EUI according to one or more embodiments. A 64-bit EUI can include an initial 24-bit OUI followed by a 40-bit unique appliance identifier as issued by the registrant organization. A 64-bit EUI can permit the unique identification of approximately 1 trillion distinct appliances.

Referring back to FIG. 1, the one or more appliances 150 can include, but are not limited to, one or more devices having a unique EUI and one or more network adapters and/or interfaces disposed therein. The unique EUI assigned to the appliance 150 can identify the manufacturer of the appliance, the appliance type, and a particular model or part number for the appliance. The network adapter or interface disposed within the appliance 150 can include one or more wired and/or wireless adapters or interfaces. In one or more embodiments, the one or more network adapters can include one or more wireless local area network (WLAN) adapters, one or more wireless wide area network (WWAN) adapters or any combination thereof. In one or more embodiments, the WLAN and/or WWAN networks can communicate using an IEEE 802.11 (Wi-Fi) protocol, including, but not limited to, 802.11(b), 802.11(g), 802.11(n), or the like. In one or more embodiments, the one or more network adapters can include one or more wired local area network (LAN) adapters, one or more wired wide area network (WAN) adapters or any combination thereof. In one or more embodiments, a combination of wired (LAN/WAN) and wireless (WLAN/WWAN) adapters can be disposed within a single appliance 150.

The one or more network adapters disposed in, on, or about the one or more appliances 150 can communicatively couple to one or more first networks 140. In one or more embodiments, the one or more appliances 150 can broadcast their unique EUI across the first network either continuously or intermittently via the one or more network adapters disposed in, on, or about each of the one or more appliances 150.

The one or more network access devices 120 can be communicatively coupled to the first network 140. Additionally, the network access device 120 can be communicatively coupled to a second network 160. In one or more specific embodiments, the one or more network access devices 120 can be simultaneously communicatively coupled to the first network 140 and the second network 160. In one or more embodiments, the second network 160 can be communicatively coupled to an appliance database containing, inter alia, control data for one or more remotely controlled appliances 150 cross indexed by EUI. In one or more embodiments, the second network 160 can include, but is not limited to one or more local area networks ("LANs"), wide area networks ("WANs"), publicly accessible networks, private networks, world wide web/internet, or any combination thereof. In one or more specific embodiments, the second network 160 can be the internet and the appliance database accessed by the network access device 120 can be accessible via the world wide web/internet.

The appliance control data accessed by the second network 160 can be downloaded to the network access device 120 via one or more communication links 165. The one or more communications links can be wireless or wired. In one or more embodiments, the first network 140 and the second network 160 can be the same network. In one or more specific embodiments, the first network 140 and the second network 160 can be a single wireless local area network ("WLAN") using an IEEE 802.11(b), (g), or (n) standard. In one or more embodiments, after downloading the appliance control data, the network access device can store the downloaded data on one or more optional storage devices 130.

The one or more remote access devices 120 can monitor the appliance EUIs broadcast onto the first network 140 by the one or more remotely controlled appliances 150. Upon detecting a new EUI, the one or more network access devices 120 can determine whether the appliance control data associated with the detected EUI is present on the storage device 130 and thus has been downloaded from the second network 160. If the appliance control data has not been previously downloaded, the network access device 120 can access and download the appliance control data from one or more databases disposed on the second network 160. The downloaded appliance control data can be stored in the network access device 120 and/or in one or more network storage devices 130.

The one or more controllers 110 can be communicatively coupled to the network access device 120 via the first network 140 and one or more communications links 115. The communications link 115 can be wired or wireless. In one or more embodiments, the communications link 115 can use an IEEE 802.11 (Wi-Fi) protocol such as 802.11(b), 802.11(g), 802.11(n); Bluetooth®; or the like. The appliance control data stored in the network access device 120 and/or network storage devices 130 can be transferred from the network access device 120 to the one or more controllers 110 via the one or more communications links 115, 145.

After receiving the appliance control data from the one or more network access devices 120, the controller 110 can be communicatively coupled 155 to the one or more remotely controlled appliances 150. The communicative coupling 155 between the controller 110 and the one or more remotely controlled appliances 150 can be wired or wireless. In one or more embodiments, the communicative coupling 155 can be via one or more radio frequency (RF) signals, one or more laser signals, one or more infrared (IR signals), combinations thereof, or the like.

Due to the large number of remotely controlled appliances, an exhaustive discussion encompassing all remotely controlled appliances is difficult. One of ordinary skill in the art would readily recognize the broad applicability of one or more embodiments of the present invention to an almost infinite number of remotely controlled appliances. For brevity and readability, the programming and operation of an illustrative, non-limiting, television remote controller will be discussed with reference to FIGS. 5, 6, and 7.

Figure 5:
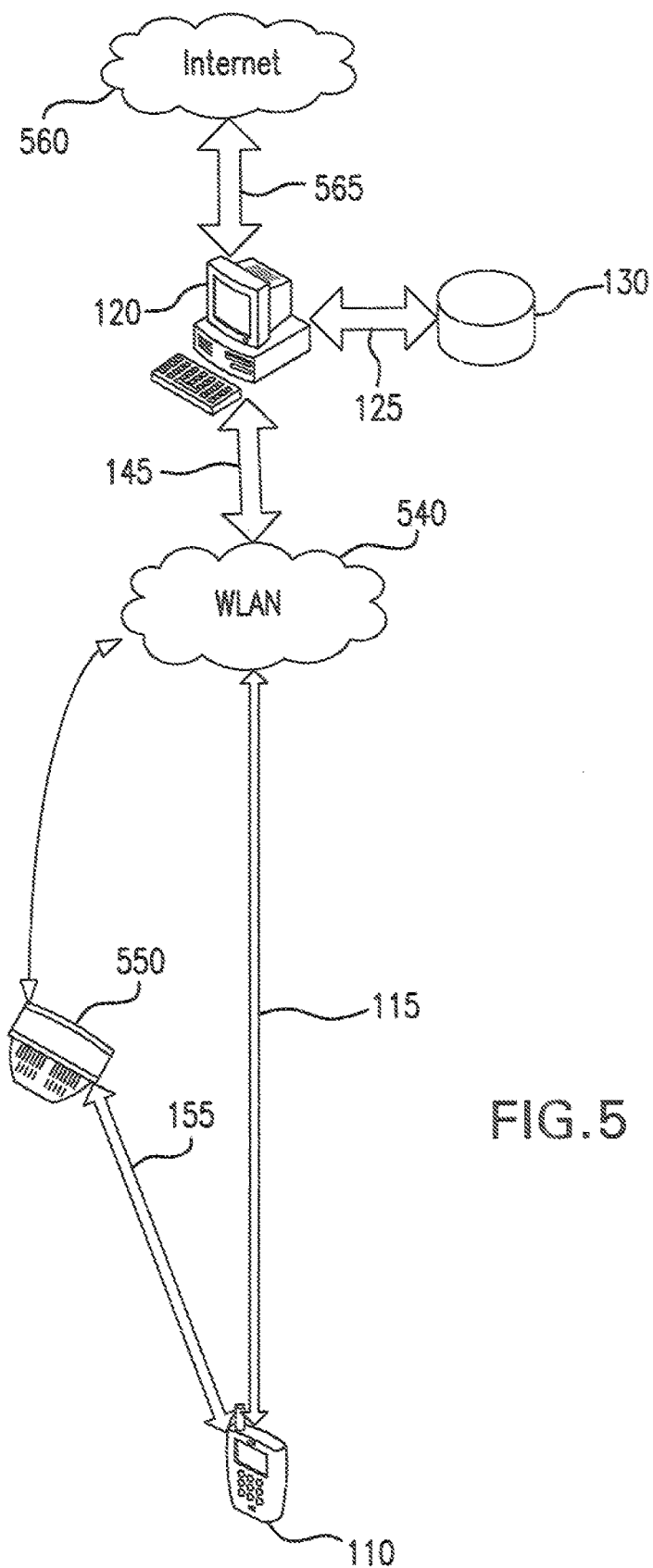
FIG. 5 depicts an illustrative system for programming a television remote controller, according to one or more embodiments described.

FIG. 5 depicts an illustrative system for programming a television remote controller, according to one or more embodiments. In one or more embodiments, a television 550 can be communicatively coupled to a wireless local area network ("WLAN") 540 using an IEEE 802.11(b), (g), or (n) protocol. The network access device 120 can be a personal computer having one or more storage devices 130 communicatively coupled thereto via one or more busses 125. The personal computer 120 includes a processor and has a network interface that can be communicatively connected to the internet 560 via one or more connections 565. A handheld controller 110 can be communicatively coupled to the wireless local area network 540 via one or more connections 115.

In one or more embodiments, the television 550 can establish communication via the 802.11(b/g/n) compatible WLAN 540 when the television 550 is powered on. After establishing contact with the WLAN 540, the television 550 can transmit its unique EUI across the WLAN 540 to the personal computer 120. The television 550 can transmit the EUI continuously while in operation, intermittently, at regular intervals, at irregular intervals, or any pattern of continuous or intermittent signals either continuously or for a finite duration while in operation.

Figure 6:
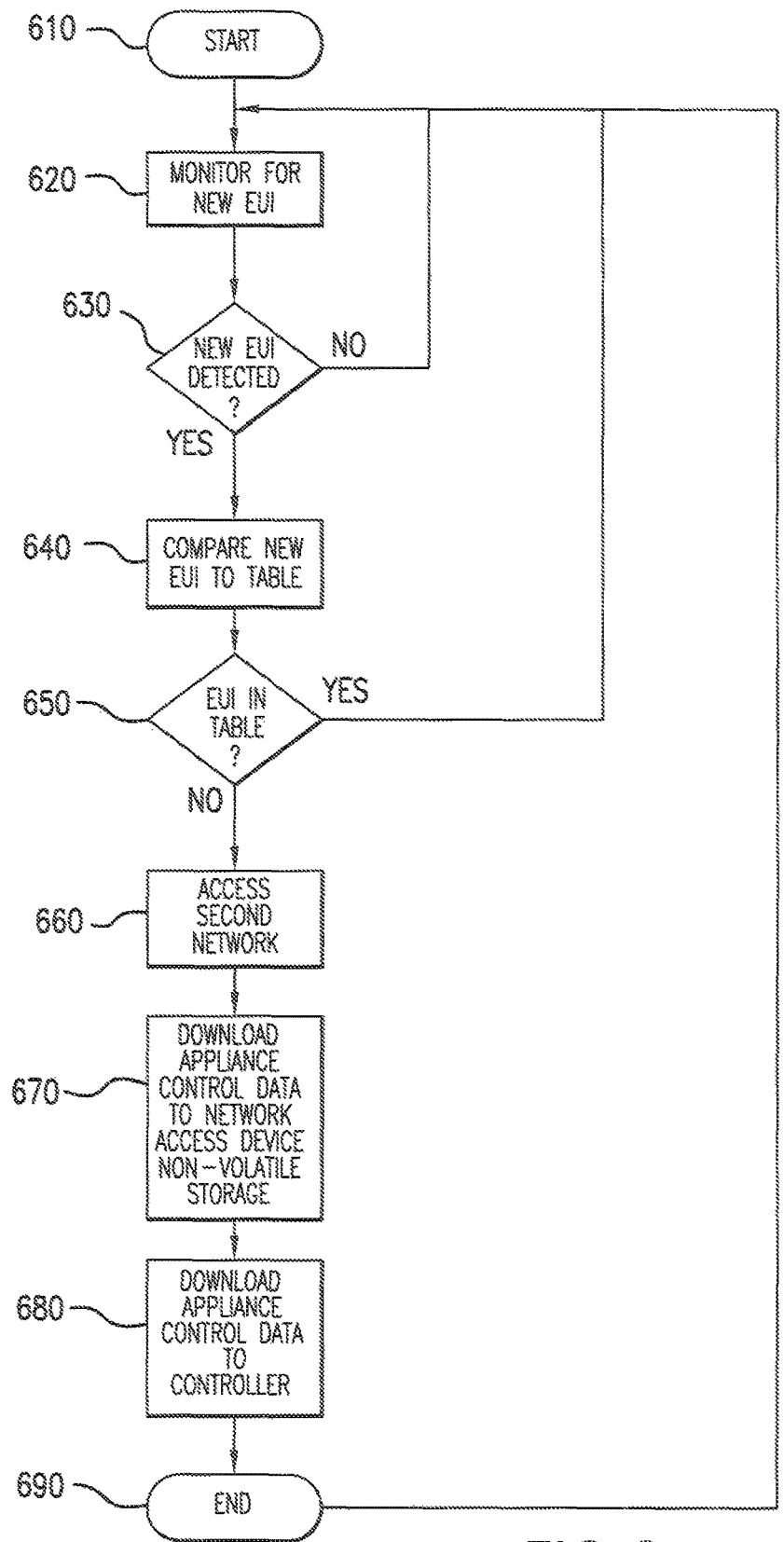
FIG. 6 depicts an illustrative logic flow diagram for downloading control data to a network access device 120, according to one or more embodiments described.

FIG. 6 depicts an illustrative logic flow diagram for downloading control data to a network access device 120, according to one or more embodiments. When the television 550 EUI is detected by the network access device, for example the personal computer 120, logic flow similar to that depicted in FIG. 6, can be followed. The personal computer 120 can continuously monitor the WLAN for the presence of new EUIs as depicted in step 620. Upon detecting a new EUI, the personal computer can determine whether the EUI is present in the volatile storage in the personal computer in step 630. The EUI may be present in volatile storage, for example, if power to the television 550 has been on/off cycled while the personal computer 120 has been continuously powered.

If the EUI is not found in volatile storage, the personal computer 120 can compare the new EUI to determine whether the EUI is present in non-volatile storage, for example in the storage device 130, in step 650. The EUI may be present in non-volatile storage, for example, if the television 550 had previously broadcast the manufacturer's EUI over the WLAN 540 and the personal computer 120 had downloaded the television control data from the internet 560. The presence of the television control data in one or more memory storage modules 130 can indicate that the television control data has already been transferred to the controller 110, and therefore does not require downloading from the internet 560.

If the EUI is not in non-volatile storage 130, the personal computer can access the internet 560 in step 660. After accessing the internet and locating one or more control data tables, the personal computer 120 can download television control data in step 670 based upon the EUI supplied by the television 550. In one or more embodiments, after downloading the television control data from the internet 560, the personal computer 120 can store the control data and associated EUI in non-volatile storage 130.

The personal computer 120 can communicative couple to the controller 110 and transfer all or a portion of the television control data via the WLAN 540. The transfer can be contemporaneous with the download of the television control data from the internet 560 or subsequent to the completion of the download of the television control data from the internet 560. The personal computer 120 can transfer all or a portion of the television control data to the one or more controllers 110 via one or more communications links 115. In one or more embodiments, the one or more communications links 115 can include a WLAN connection as depicted in FIG. 5.

Figure 7:
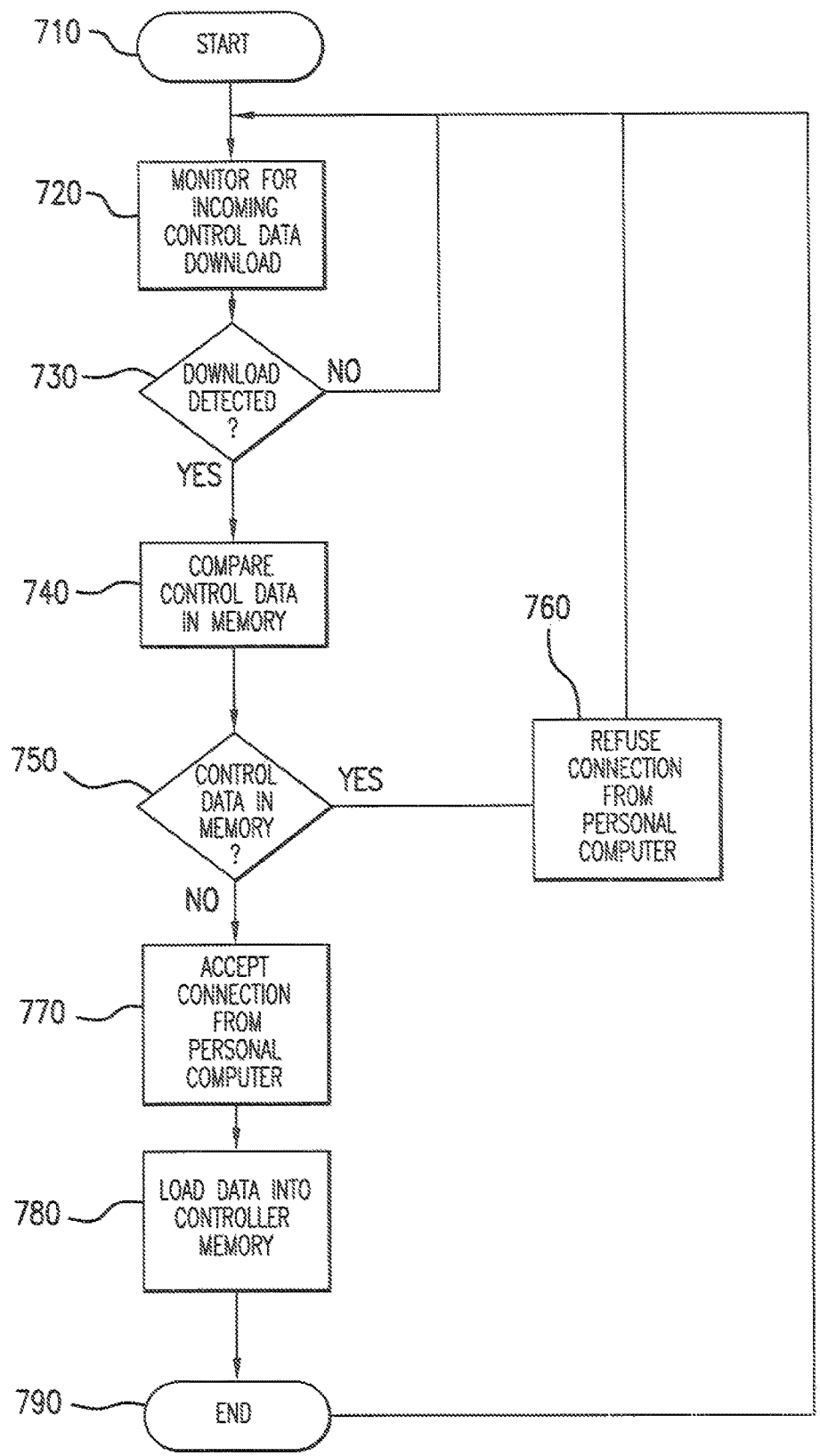
FIG. 7 depicts an illustrative logic flow diagram for downloading control data to a controller 110, according to one or more embodiments described.

FIG. 7 depicts an illustrative logic flow diagram for downloading control data to a controller 110, according to one or more embodiments. When the personal computer 120 transfers all or a portion of the television control data to the one or more controllers 110, logic flow similar to that depicted in FIG. 7, can be followed. In one or more embodiments, the controller 110 can continuously or intermittently monitor the WLAN 540 for the presence of one or more incoming control data downloads originated by the personal computer 120 in step 720.

Upon detecting the presence of a control data download via one or more communications links 115 in step 730, the controller 110 can compare the control data download supplied by the personal computer 120 to download data already stored in memory disposed within the controller 110 in step 740. If, in step 750, the controller 110 finds the control data already present in memory then the controller 110, in step 760, can refuse the connection from the personal computer 120 across the WLAN 540.

If, in step 770, the controller finds that the control data supplied by the personal computer 120 across the WLAN 540 is not present in controller 110 memory, then the connection with the personal computer 120 can be accepted. After accepting the connection from the personal computer, the control data can be loaded into the controller 110 memory in step 780.

Referring back to FIG. 5, after the television control data is loaded into controller 110 memory, the controller 110 can be used to control the operation of the television 550. For example, the controller 110 can be used to control the tuning, volume, inputs and outputs on the television 550 via one or more communications links 155. The one or more communications links 155 can include one or more laser, RF, or IR links.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A computer comprising:
a storage device; and
a processor to:
receive an identifier of an appliance that is remotely controllable by a handheld controller separate from the computer, wherein the identifier is received by the computer wirelessly over a wireless first network from the appliance without the identifier passing through the handheld controller;
in response to receiving the identifier, access a second network and download appliance control data from a source coupled to the second network; and
send the downloaded appliance control data wirelessly over the wireless first network to the handheld controller, the appliance control data useable by the handheld controller for remotely controlling operation of the appliance by the handheld controller sending control signals to the appliance over a wireless link between the handheld controller and the appliance.

2. The computer of claim 1, wherein the identifier comprises an IEEE Extended Unique Identifier.

3. The computer of claim 2, wherein the appliance control data is downloaded from an appliance database storing data indexed using all or a portion of the Extended Unique Identifier.

4. The computer of claim 2, wherein the Extended Unique Identifier comprises an Internet Protocol version 6 IEEE compliant Extended Unique Identifier.

5. The computer of claim 2, wherein the Extended Unique Identifier comprises a 48-bit Extended Unique Identifier (EUI-48), a 60-bit Extended Unique Identifier (EUI-60), a 64-bit Extended Unique identifier (EUI-64), or any combination thereof.

6. The computer of claim 1, wherein the processor is to access the second network that includes the internet, a corporate intranet, a local area network, a wide area network, or any combination thereof.

7. The computer of claim 1, wherein the downloaded appliance control data sent to the handheld controller is useable to remotely control the appliance that is selected from among an electrical device, an audio device, a video device, a household appliance, a computing device, a computer peripheral, a communication device, or any combination thereof.

8. The computer of claim 1, wherein the processor is to further:
compare the identifier to data in the storage device of the computer to determine whether the identifier is present in the storage device of the computer,
wherein the downloading of the appliance control data is in response to determining that the identifier is not present in the storage device.

9. The computer of claim 1, wherein the processor is to re-iterate the receiving, the accessing, the downloading, and the sending for a second appliance.

10. The computer of claim 1, wherein the receiving of the identifier of the appliance is based on the computer monitoring the wireless first network for identifiers transmitted by appliances.

11. A method comprising:
receiving, by a computer, an identifier of an appliance that is remotely controllable by a handheld controller separate from the computer, wherein the identifier is wirelessly received by the computer over a wireless first network from the appliance without the identifier passing through the handheld controller;
in response to receiving the identifier, accessing, by the computer, a second network and downloading appliance control data from a source coupled to the second network; and
wirelessly sending, by the computer, the downloaded appliance control data over the wireless first network to the handheld controller, the appliance control data usable by the handheld controller for remotely controlling operation of the appliance by the handheld controller sending control signals to the appliance over a wireless link between the handheld controller and the appliance.

12. The method of claim 11, wherein the appliance control data corresponds to an IEEE Extended Unique Identifier ("EUI") transmitted by the appliance to the computer.

13. The method of claim 12, wherein the EUI comprises a 48-bit Extended Unique Identifier ("EUI-48"), a 60-bit Extended Unique Identifier ("EUI-60"), a 64-bit Extended Unique identifier ("EUI-64"), or any combination thereof.

14. The method of claim 11, further comprising:
comparing, by the computer, the identifier to data in a storage device of the computer to determine whether the identifier is present in the storage device of the computer,
wherein the downloading of the appliance control data is in response to determining that the identifier is not present in the storage device.

15. The method of claim 11, further comprising:
re-iterating, by the computer, the receiving, the accessing, the downloading, and the sending for a second appliance that is remotely controllable by the handheld controller.

16. The method of claim 11, wherein the receiving of the identifier of the appliance is based on the computer monitoring the wireless first network for identifiers transmitted by appliances.

17. A non-transitory storage medium storing instructions executable by a computer to:
receive an identifier of an appliance that is remotely controllable by a handheld controller physically separate from the computer, wherein the identifier is received by the computer wirelessly over a wireless first network from the appliance without the identifier passing through the handheld controller;
in response to receiving the identifier, access a second network and download appliance control data from a source coupled to the second network; and
send the downloaded appliance control data wirelessly over the wireless first network to the handheld controller, the appliance control data useable by the handheld controller for remotely controlling operation of the appliance by the handheld controller sending control signals to the appliance over a wireless link between the handheld controller and the appliance.

18. The non-transitory storage medium of claim 17, wherein the receiving of the identifier of the appliance is based on the computer monitoring the wireless first network for identifiers transmitted wirelessly by appliances.

* * * * *